3,210,332
PRODUCTION OF SOLID OLEFIN POLYMERS
Harold D. Lyons, Shawnee Mission, Kans., and Charles
W. Moberly, Bartlesville, Okla., assignors to Phillips
Petroleum Company, a corporation of Delaware
No Drawing. Filed May 3, 1963, Ser. No. 277,700
8 Claims. (Cl. 260—93.7)

This is a continuation-in-part application of our copending application Serial No. 860,322, filed December 18, 1959, and now abandoned.

This invention relates to the production of solid olefin polymers. In one aspect, the invention relates to an improved method for preparing from certain selected olefins solid polymers having a high n-heptane insolubility content.

Various reactions for polymerizing olefins are described in the literature, and the polymerizations are usually carried out in the presence of catalysts. One type of catalyst which has been recently disclosed for use in the polymerization of monoolefins, particularly ethylene, consists of an organometal compound, e.g., triethylaluminum, or a dialkylaluminum halide and a heavy metal, e.g., titanium tetrachloride or titanium trihalide. It has been found that when certain olefins, e.g., propylene, are contacted with such a catalyst, a polymer is obtained which is crystalline and which has desirable physical properties such as modulus, hardness, ultimate tensile strength, range of melting temperatures and molding and fiber forming properties. A most important factor having a significance influence on the properties of the polymer has been found to be the content of the polymer which is soluble in aliphatic hydrocarbons. In other words, the greater the percent of the hydrocarbon insoluble material in the polymer the more favorable are the above properties. A frequently employed test method is described in Example I and produces a number indicative of the n-heptane insolubles in the polymer. Another hydrocarbon frequently employed is n-pentane which produces a value which is different from the n-heptane test but which is related. The reason for the effect by the insoluble content on these physical properties is not known. However, it has been found that these polymers are characterized by certain regularity of molecular structure. Thus, a polypropylene molecule can be considered as a chain of 2-carbon units with a methyl side group attached to every other carbon atom in the chain. Certain polymers of this type are characterized by the fact that they contain a series of such monomer units in which all of the methyl side groups are oriented in space at the same position or at the same angle with respect to the respective tertiary carbon atoms to which they are attached.

It is an object of this invention, therefore, to provide an improved process for producing polymers having a high aliphatic hydrocarbon insolubility content.

Another object of the invention is to provide a process for preparing polymers having n-heptane insolubility contents which are higher than those of conventionally prepared polymers.

A further object of the invention is to provide a process in which increased yields of polymers are obtained which have a high n-heptane insolubility content.

Still another object is to produce a polymer having a reduced pentane-solubles content.

Other and further objects and advantages of the invention will become apparent to those skilled in the art upon consideration of the accompanying disclosure.

The present invention resides in the discovery that certain olefin polymers having a very high content of aliphatic hydrocarbon insolubles can be prepared if the polymerization is carried out in the presence of a catalyst adjuvant comprising a ketone or polyketone. Broadly speaking, in a process in which an olefin corresponding to the formula R—CH=CH$_2$, wherein R is an alkyl radical containing from 1 to 4 carbon atoms, is polymerized in the presence of a catalyst prepared by admixing at least two essential components, one of said components being a metal compound selected from the group consisting of Group IV, V, VI and VIII metal compounds, and another of said components being selected from the group consisting of organometal compounds, metal hydrides or metals of Groups I, II and III, the instant invention resides in the improvement of conducting the polymerization in the presence of a compound selected from the group consisting of ketones and polyketones.

The adjuvant compounds contain from 1 to 14, preferably 1 to 2, inclusive, groups of the formula

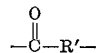

in which R' is an alkylene or phenylene group and the total number of carbon atoms in each compound is in the range of 3 to 30, preferably 3 to 15, inclusive. Examples of ketones and polyketones suitable for use in the process include acetone, methyl ethyl ketone, methyl n-propyl ketone, diethyl ketone, 2-hexanone, 3-hexanone, diisopropyl ketone, cyclohexanone, benzophenone, benzil, 2,4-pentanedione, 2,5-hexanedione, 2,4,6,8-nonane tetrone, 2,4,6,8,10,12,14,16,18,20,22,24,26,28-tricontane tetradecone, and the like.

When proceeding in accordance with the present invention, it has been found that polymers having n-heptane insoluble contents in the range of 83 to 98 percent and higher can be readily prepared. In comparison, if the polymerization is conducted in the absence of the adjuvant of this invention with a catalyst comprising, e.g., titanium trichloride and triethylaluminum, the n-heptane insoluble content of the polymer is usually around 80 percent. The reason for the unexpected improvement obtained when utilizing the ketones or polyketones in the process of this invention is not completely understood. However, it is apparent that the additive materials act to modify the action of the catalyst system so that the polymer product is one having a high n-heptane insoluble content. In general, the addition of the ketones and polyketones to the polymerization system as herein described makes it possible to obtain a polymer product having a higher aliphatic hydrocarbon insolubility content than that obtainable in the absence of such compounds.

The olefins which are polymerized in accordance with the present process correspond to the formula

wherein R is selected from the group consisting of an alkyl radical containing from 1 to 4, inclusive, carbon atoms. Examples of suitable olefins include propylene, 1-butene, 1-pentene, 2-methyl-1-butene, 2-methyl-1-pentene, 4-methyl-1-pentene, 3,3-dimethyl-1-butene, and the like. It is often preferred to utilize propylene as the monomer. The term polymer includes both homopolymers and copolymers of the above monomers as well as materials copolymerizable therewith. Suitable copolymers include copolymers of propylene and butene-1, ethylene and propylene, and 4-methyl-1-pentene and propylene and/or ethylene. Whenever the catalyst system produces a polymer having a least portion which is insoluble in n-heptane, the adjuvant of the invention will increase the n-heptane insolubility content of the polymer.

The polymerization process of this invention is preferably conducted in the presence of a catalyst system prepared by admixing at least two components wherein one component is an organometal compound, including compounds where one or more, but not all, organo groups are replaced by halogen, a metal hydride, or a metal of Group I, II or III, and the second component is a Group IV, V, VI or VIII (Mendelyeev's Periodic System) metal compound. The organometal compounds referred to include, without limitation, alkyl, cycloalkyl or aryl compounds of mono-, di-, tri-, or tetravalent metals, particularly aluminum, gallium, indium, beryllium, sodium, potassium, lithium, rubidium, cesium, magnesium, cadmium, mercury, zinc, barium, or such organometal compounds where one or more but not all of the alkyl, cycloalkyl, or aryl groups is replaced by a hydrogen atom and/or a halogen atom. The organo groups can be quite large, compounds being applicable which have 15 or more carbon atoms in each alkyl, cycloalkyl or aryl group, and 40 carbon atoms or more in the molecule. Specific examples of such organometal compounds include trimethylaluminum, triethylaluminum, triisobutylaluminum, a mixture of diethylaluminum chloride and ethylaluminum dichloride (sometimes referred to as ethylaluminum sesquichloride), diethylaluminum hydride, ethylaluminum dichloride, diethylaluminum chloride, trioctylaluminum, tridodecylaluminum, triphenylaluminum, triphenylgallium, diphenylberyllium, dicyclohexylberyllium, cyclohexylzinc fluoride, $CH_3AlCl_2$, $(CH_3)_2AlCl$, $(C_4H_9)_2AlBr$, $C_8H_{17}AlI_2$, $(C_3H_7)_2GaF$, $(C_6H_{11})_2GaCl$ (cyclohexane derivative), $C_6H_5GaBr_2$, $C_{20}H_{41}GaBr_2$, $(C_{14}H_{29})_2GaF$, $(C_6H_5)_2InCl$, $C_8H_{17}InF_2$, $C_6H_{11}InBr_2$ (cyclohexane derivative), $C_{17}H_{35}BeI$, $CH_3BeBr$, and the like.

The metal hydrides can include, as specific examples, aluminum hydride, lithium aluminum hydride, barium hydride, gallium hydride, indium hydride, sodium aluminum hydride, and potassium beryllium hydride.

The metals of Groups I, II and III are applicable as a class, the most important members being sodium, magnesium and aluminum.

The compounds of the metals of Groups IV, V, VI and VIII of the Periodic System include the oxides, hydrides, halides, oxyhalides and salts of organic acids, usually having 20 or less carbon atoms, such as formic acid, caprylic acid, lauric acid, palmitic acid, and arachidic acid. It is usually preferred to employ compounds of titanium, zirconium, hafnium, chromium, thorium, molybdenum, vanadium, niobium, tantalum and iridium. Of the various compounds, it is generally preferred to employ the titanium halides, including the chlorides, fluorides, bromides and iodides, particularly the tri- and tetrachlorides, the tri- and tetrabromides, and the tri- and tetraiodides of titanium.

A third catalyst component which can be advantageously used is an organic halide or metal halide where the organic radical has 30 or less carbon atoms and is an alkyl, cycloalkyl or aryl group. Specific examples include ethyl bromide, ethyl trichloro titanum, bromobenzene, cyclohexyl chloride, and the like. Also applicable as third catalyst components are the alkali metal and ammonium halides, and aluminum halides (where the catalyst also includes another metal compound such as a titanium compound), a halogen, a hydrogen halide, an organophosphorus-containing compound, and a peroxide.

The invention is particularly advantageous when the adjuvant is employed in conjunction with an initiator system prepared by admixing an alkyl aluminum and a titanium trihalide, for example, a trialkylaluminum or a dialkylaluminum halide plus a titanium trihalide, such as titanium trichloride.

The preferred initiator system, particularly in the mass polymerization of propylene, is prepared by admixing a dialkylaluminum halide, preferably a dialkylaluminum chloride, e.g., diethylaluminum chloride, and the reaction product of titanium tetrachloride and aluminum, said reaction product having the approximate formula $3TiCl_3 \cdot AlCl_3$.

The ratio of the catalyst components employed in the present process can be varied rather widely, depending upon the particular monomer used and the operating conditions. The mol ratio of the organometal compound, metal hydride or Group I, II or III metal to the Group IV, V, VI or VIII metal compound is usually in the range of 1:1 and 10:1 with a preferred range being 2:1 and 5:1. The concentration of catalyst in the polymerization zone is usually in the range of 0.01 to 5 weight per cent, based on the monomer charged to that zone, although lesser or greater amounts can be used. The adjuvants of the invention are incorporated in the catalyst composition in a ratio of 0.01 to 4.0 mols per mol of the Group IV, V, VI or VIII metal compound. Addition of the additive material can be made at any point in the preparation of the catalyst. A convenient method of operation is to add the adjuvant along with the diluent in the initial charge to the reactor.

The polymerization of the 1-olefin with the catalyst and adjuvant of the invention can be conducted by any suitable means such as a solution process or the mass procedure and under conditions well known to those skilled in the art. As is well known to those skilled in the art, the polymerization of the alpha-olefins may be conducted in the presence of a hydrocarbon diluent which is inert and liquid under the conditions of the process and does not have a deleterious effect on the catalyst. Suitable diluents include paraffinic, cycloparaffinic, and/or aromatic hydrocarbons. Examples of such diluents include propane, butane, pentane, hexane, cyclohexane, methylcyclohexane, benzene, toluene, the xylenes, and the like, and mixtures thereof. The relative amounts of diluent and olefin employed in the polymerization depend upon the particular conditions or techniques used and are generally governed by the capacity of the apparatus to effect suitable agitation and heat removal. The polymerization can be carried out at a temperature varying over a rather broad range, for example, at a temperature of $-100$ to $500°$ F. In general, pressures are satisfactory which are sufficient to maintain the reaction mixture substantially in the liquid phase.

Although the invention is not limited thereby, one particularly preferred method is the so-called mass polymerization system wherein the monomer, preferably the propylene, is liquefied and contacted in the reaction zone with a two or more component initiator system discussed hereinbefore, preferably in the presence of hydrogen. When employing propylene as the monomer and diluent, a suitable temperature is in the range of about 0 to $250°$ F.

The process of the invention can be carried out as a batch process, e.g., by pressuring the olefin to be polymerized into a reactor containing a catalyst system, the adjuvant and the diluent. Furthermore, the process can be carried out continuously by maintaining the reactants in the reactor for a suitable residence time. The residence time employed in the continuous process can vary widely since it depends to a great extent upon the temperature and the specific olefin. However, the residence time in a continuous process generally falls within the range of 1 second to 5 hours or more. In a batch process, the reaction time can also vary widely, such as from 15 minutes up to 24 hours or more.

It has been found that various materials in some instances may have a tendency to inactivate the catalyst composition of this invention. These materials include carbon dioxide, oxygen and water. Accordingly, it is usually desirable to free the olefins to be polymerized from these materials as well as from other materials which may tend to inactivate the catalyst before contacting the olefin with the catalyst. Any of the known means for removing such contaminants can be employed. Furthermore, the hydrocarbon diluent employed in the process is preferably freed of contaminants, such as water, oxygen and the like. It is desirable also that air and moisture be removed from the reaction vessel before the reaction is carried out. This is usually accomplished by purging with an inert gas such as nitrogen. In some cases, small amounts of catalyst inactivating materials, such as oxygen and water, can be tolerated in the reaction mixture while still obtaining reasonably good polymerization rates. However, it is to be understood that the amount of such materials present in the reaction mixture shall not be sufficient to completely inactivate the catalyst.

The treatment of the polymerizate subsequent to the polymerization step depends upon the type of process employed for the polymerization. For example in a solution process upon completion of the polymerization, by one suitable method, any excess olefin is vented and the contents of the reactor are treated so as to inactivate the catalyst and remove the catalyst residue. The polymer is then precipitated and separated from the diluent by decantation, filtration or other suitable method, after which the polymer is dried.

In one suitable method in the mass polymerization process, the polymerizate from the reactor is charged to a suitable vessel and the catalyst residue is removed by contact with an extractant, such as a diketone, e.g., acetylacetone, in the presence of propylene oxide. Prior to the discovery of the adjuvant herein its was generally necessary to wash the effluent with an extractant for the amorphous polymer, such as propylene, propane, or other hydrocarbon mixtures thereof, at a temperature preferably less than 80° F. After separation the polymer is dried.

One of the advantages of the invention is that a polymer having a low amorphous content is produced. Although the amorphous materials are generally soluble in hydrocarbons and can thus be removed by extraction, such procedures are time and labor consuming and require extensive and costly additional equipment. Thus, a satisfactory method for the prevention of their formation during polymerization constitutes a significant contribution to the art.

A more complete understanding of the invention can be obtained by referring to the following illustrative examples which are not intended, however, to be unduly limitative of the invention.

Although the improvement shown herein is described in terms of "n-heptane insolubility content" determined as described hereinafter in Example 1, the use of the adjuvant also results in the formation of a polymer with a lower amount of pentane soluble material than is obtained when no adjuvant is employed. This pentane-soluble content may be determined as described in Example II.

EXAMPLE I

A series of runs was carried out in which the following procedure was followed in polymerizing propylene. A one gallon stainless steel reactor was charged with 1 liter of cyclohexane, the reactor being purged with nitrogen prior to and during the charging procedure. To this system there was added a weighed amount of titanium trichloride (TiCl$_3$) and adjuvant. The reactor was then closed and flushed twice with nitrogen at 100 p.s.i. There was then added through the charging tube 500 ml. of cyclohexane in which a weighed amount of triethylaluminum (TEA) was dissolved, this charge being followed by an additional 500 ml. of cyclohexane as a rinse. The reactor was then flushed twice with propylene at 100 p.s.i.g. after which 0.6 pound of propylene was charged. The temperature was then raised to 225° F. and maintained between this temperature and 260° F. for the duration of the run. After about 1.5 hours, additional propylene was introduced to maintain a pressure of about 150 p.s.i.g. At the end of 2.5 hours, the propylene feed was shut off, and the reactor was allowed to cool overnight.

The contents of the reactor were removed and washed, first with about 3 liters of isopropanol and then with an equal amount of methanol. Thereafter, the polymer was recovered, sprayed with about 0.1 percent Ionol (2,4-di-t-butyl-3-methyl phenol) and dried overnight at 80° C. in a vacuum oven.

The n-heptane insolubles content of the products was determined by placing 2.5±0.1 grams of polymer in a weighed extraction thimble and extracting in an ASTM Rubber Extraction Apparatus for 2.5 hours with 100 ml. of normal heptane. The thimble was then removed and dried in a forced air oven at 110° C. for 2 hours after which it was cooled in a desiccator and weighed. The weight percent of residue based on original polymer was calculated and recorded as the n-heptane insolubles content of the polymer.

Data for the runs are shown hereinbelow in the table.

*Table I*

| Run No. | 1* | 2* | 3 | 4 | 5 | 6 | 7 |
|---|---|---|---|---|---|---|---|
| TEA, grams | 1.31 | 1.52 | 1.42 | 1.26 | 1.23 | 1.32 | 1.35 |
| TiCl$^3$, grams | 0.594 | 0.689 | 0.643 | 0.572 | 0.557 | 0.595 | 0.609 |
| 2,4-Pentanedione, grams | | | 0.417 | 0.185 | | | |
| Benzil, grams | | | | | 0.380 | | |
| Acetone, grams | | | | | | 0.112 | 0.293 |
| Mol Ratio Catalyst TEA/TiCl$_3$/Adjuvant | 3.0/1/0 | 3.0/1/0 | 3.0/1.0 | 2.9/1/0.5 | 3.0/1/0.5 | 3.0/1/0.5 | 2.9/1/1.28 |
| Yield, grams | 435 | 531 | 26 | 504 | 419 | 423 | 44 |
| Productivity, gm. polymer/gm. cat | 228 | 240 | 12 | 295 | 236 | 210 | 23 |
| n-heptane insolubles content, percent | 80.5 | 80.0 | 87.5 | 83.5 | 86 | 84 | 86 |

*Control runs.

Included in the table are data for control runs which are carried out in the absence of the adjuvant of this invention.

From a consideration of the data in the foregoing table, it is seen that in the runs conducted according to the present invention, polypropylene products were obtained which had n-heptane insolubles contents ranging from 83.5 to 87.5 percent. These runs are to be compared with the control runs in which the products had an n-heptane insolubles content of only about 80 percent.

EXAMPLE II

In a series of runs, propylene was polymerized in a mass system using a mixture if diethylaluminum chloride and the reaction product of aluminum and TiCl$_4$ having the approximate formula (3TiCl$_3$·AlCl$_3$) as catalyst and conducting the reaction in the presence of elemental hydrogen. Combined with the catalyst as an adjuvant therefor was a measured amount of benzophenone. The runs were made in a 1-liter stainless steel reactor into which, after purging with propylene, were charged the catalyst components, the adjuvant, hydrogen, and 150 gm. propylene. Reaction was conducted at 130° F. for 2.5 hours after which the unreacted propylene was vented and the polymer recovered. From the reactor the polymer was transferred to a 500 ml. graduated cylinder. To the cylinder was added 450 ml. of pentane. About once each hour for 4 or 5 hours the cylinder was shaken to ensure thorough contacting of the polymer with pentane. The cylinder was allowed to stand over night after which a 200 ml. aliquot of the solvent was removed to a weighed vessel from which the pentane was evaporated. After removal of the pentane the solid residue was heated at 110° C. for 15 minutes, cooled and weighed. Pentane solubles in the total polymer were then calculated. Data on these runs are shown below.

Table II

| Run No. | DEAC [a] (gm.) | 3TiCl₃·AlCl₃ [b] (gm.) | Benzo-phenone (gm.) | Hydrogen (liters) at STP | Pentane Solubles percent | Reduction percent | n-heptane insolubles [d] Content percent |
|---|---|---|---|---|---|---|---|
| 1 | 0.234 | 0.100 | [c] 0.10 | 1 | 2.7 | 40.0 | 95 |
| 2 | 0.243 | 0.104 | None | 1 | 4.5 | | 93 |

[a] Diethylaluminum chloride, 25% in heptane.
[b] The reaction product of aluminum and titanium tetrachloride.
[c] In 5 ml. cyclohexane.
[d] Calculated from a comparison of polymer dissolved by the n-heptane and n-pentane methods hereinbefore described.

These data show that the presence of benzophenone in the catalyst system provides a significant reduction in pentane solubles in polypropylene prepared in the manner described. The increase in n-heptane insolubles content is especially significant at this high level of insolubility obtained with this catalyst system.

The polymers produced in accordance with this invention have utility in applications where solid plastics are used. They can be molded to form articles of any desired shape such as bottles or other containers for liquids. Furthermore, they can be formd into sheets, film or pipe by extrusion or other suitable methods.

It will be apparent to those skilled in the art that many variations and modifications of the invention can be practiced upon study of the foregoing disclosure. Such variations and modifications are believed to come within the spirit and scope of the invention.

We claim:

1. In a process for polymerizing propylene in which said propylene is contacted with a catalyst prepared by admixing alkyl aluminum and titanium trichloride in the presence of a hydrocarbon diluent at a temperature in the range of 100 to 350° F. and at a pressure in the range of 50 to 1500 p.s.i.g., the improvement which comprises conducting said contacting in the presence of from 0.01 to 4.0 mols per mol of titanium trichloride of an adjuvant compound selected from the group consisting of ketones and polyketones, said compound containing from 1 to 14, inclusive, groups of the formula

in which R is selected from the group consisting of alkylene and phenylene radicals and the total number of carbon atoms in said compound is in the range of 3 to 30 inclusive.

2. The process according to claim 1 wherein said adjuvant compound comprises 2,4-pentanedione.

3. The process according to claim 1 wherein said adjuvant compound comprises benzil.

4. The process according to claim 1 wherein said adjuvant compound comprises acetone.

5. The process according to claim 1 wherein said catalyst is prepared by admixing triethylaluminum and titanium trichloride.

6. In a process for polymerizing propylene in the presence of a catalyst prepared by admixing a dialkylaluminum halide and the reaction product of aluminum and titanium tetrachloride, the improvement comprising contacting said catalyst with propylene in the presence of an adjuvant compound selected from the group consisting of ketones and polyketones, said compound containing from 1 to 14, inclusive, groups of the formula

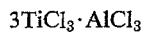

in which R' is selected from the group consisting of alkylene and phenylene radicals and the total number of carbon atoms in said compound is in the range of 3 to 30, inclusive, at a temperature in the range of 100 to 500° F., said adjuvant being present in an amount sufficient to produce a polymer having a n-heptane insolubles content higher than would be produced in the absence of said adjuvant and recovering the solid olefin polymer so produced.

7. In a process for polymerizing proylene in the presence of a catalyst prepared by admixing diethylaluminum chloride and the reaction product of aluminum and titanium tetrachloride having the approximate formula $$3TiCl_3 \cdot AlCl_3$$

said polymerization occurring in the liquid phase in the substantial absence of a hydrocarbon diluent other than propylene at a pressure in the range of 50 to 1500 p.s.i.g. and at a temperature in the range of 0 to 250° F., the improvement comprising conducting said contacting in the presence of from 0.01 to 4.0 mols per mol of titanium trichloride of an adjuvant compound selected from the group consisting of ketones and polyketones, said compound containing from 1 to 14, inclusive, groups of the formula

in which R is selected from the group consisting of alkylene and phenylene radicals and the total number of carbon atoms in said compound is in the range of 3 to 30, inclusive.

8. The process of claim 7 wherein said adjuvant comprises benzophenone.

References Cited by the Examiner

UNITED STATES PATENTS

| 2,881,156 | 4/59 | Pilar et al. | 260—94.9 |
| 3,027,360 | 3/62 | Raum | 260—94.9 |
| 3,045,001 | 7/62 | Berger | 260—94.9 |
| 3,121,063 | 2/64 | Tornquist | 260—94.9 |

FOREIGN PATENTS

| 554,242 | 2/57 | Belgium. |

JOSEPH L. SCHOFER, *Primary Examiner.*